May 11, 1937.                J. M. HOSIER                2,080,315
                             GRASS TRIMMER
             Original Filed March 15, 1935    3 Sheets—Sheet 1
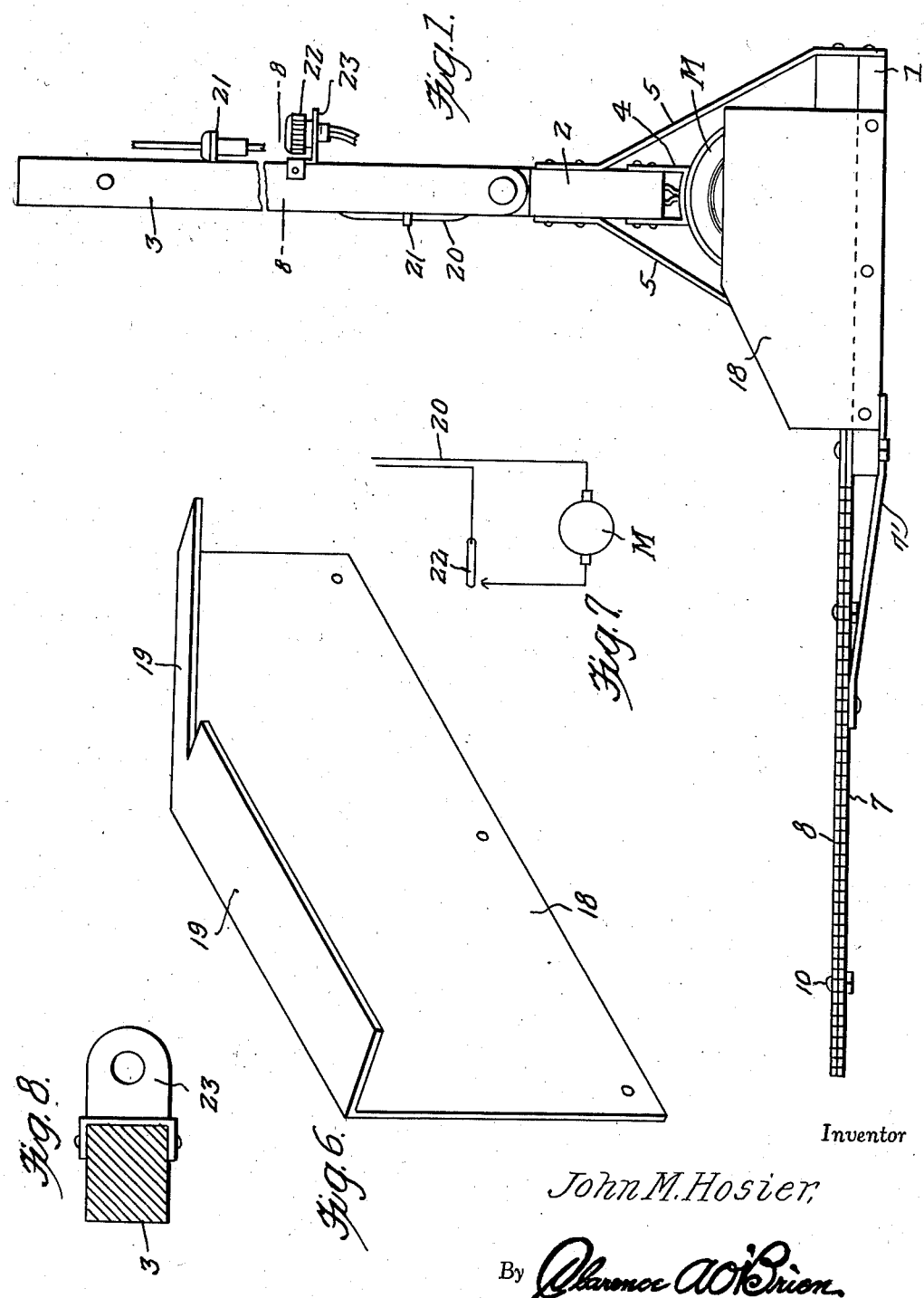
Inventor
John M. Hosier,
By Clarence A. O'Brien
                    Attorney

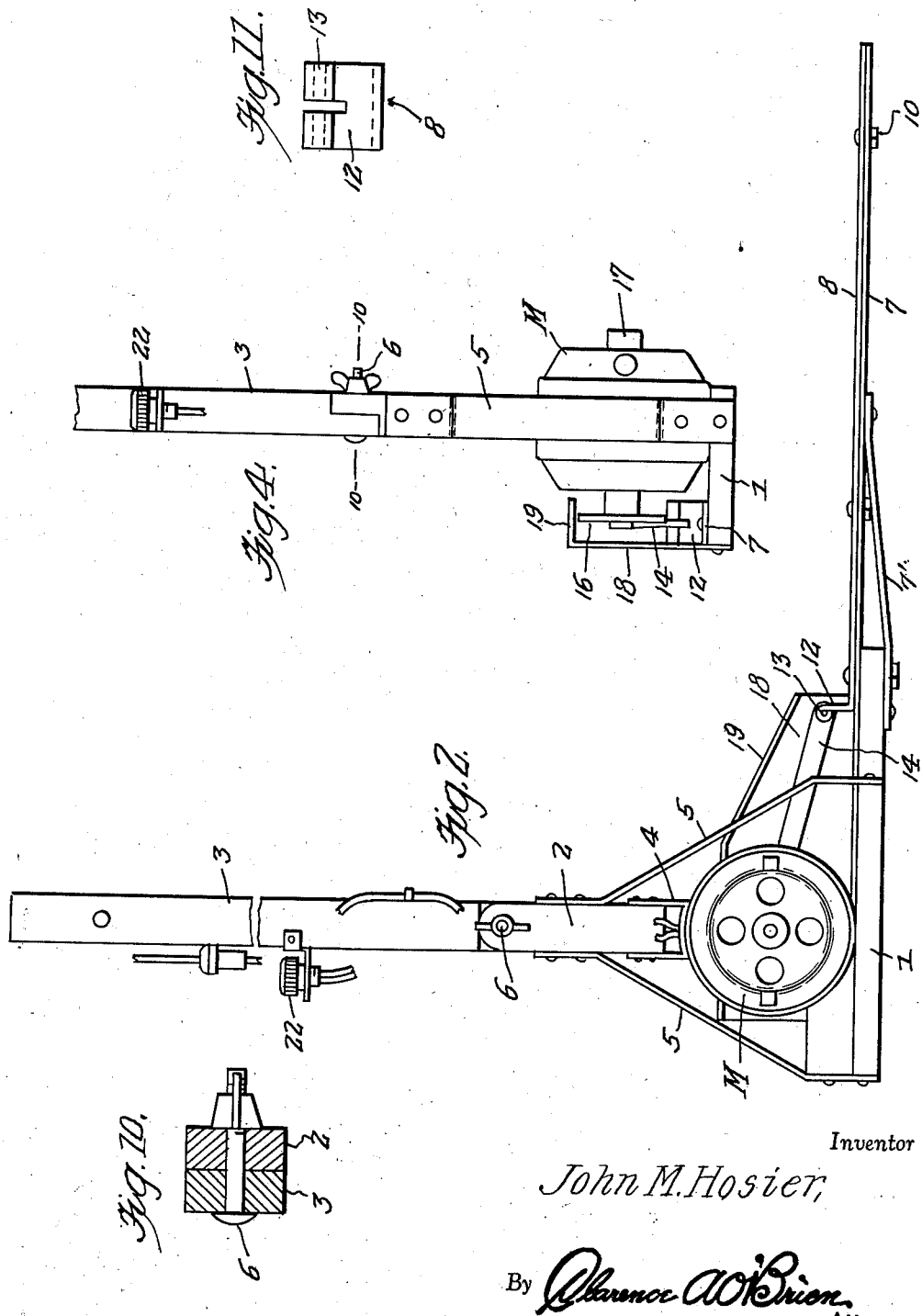

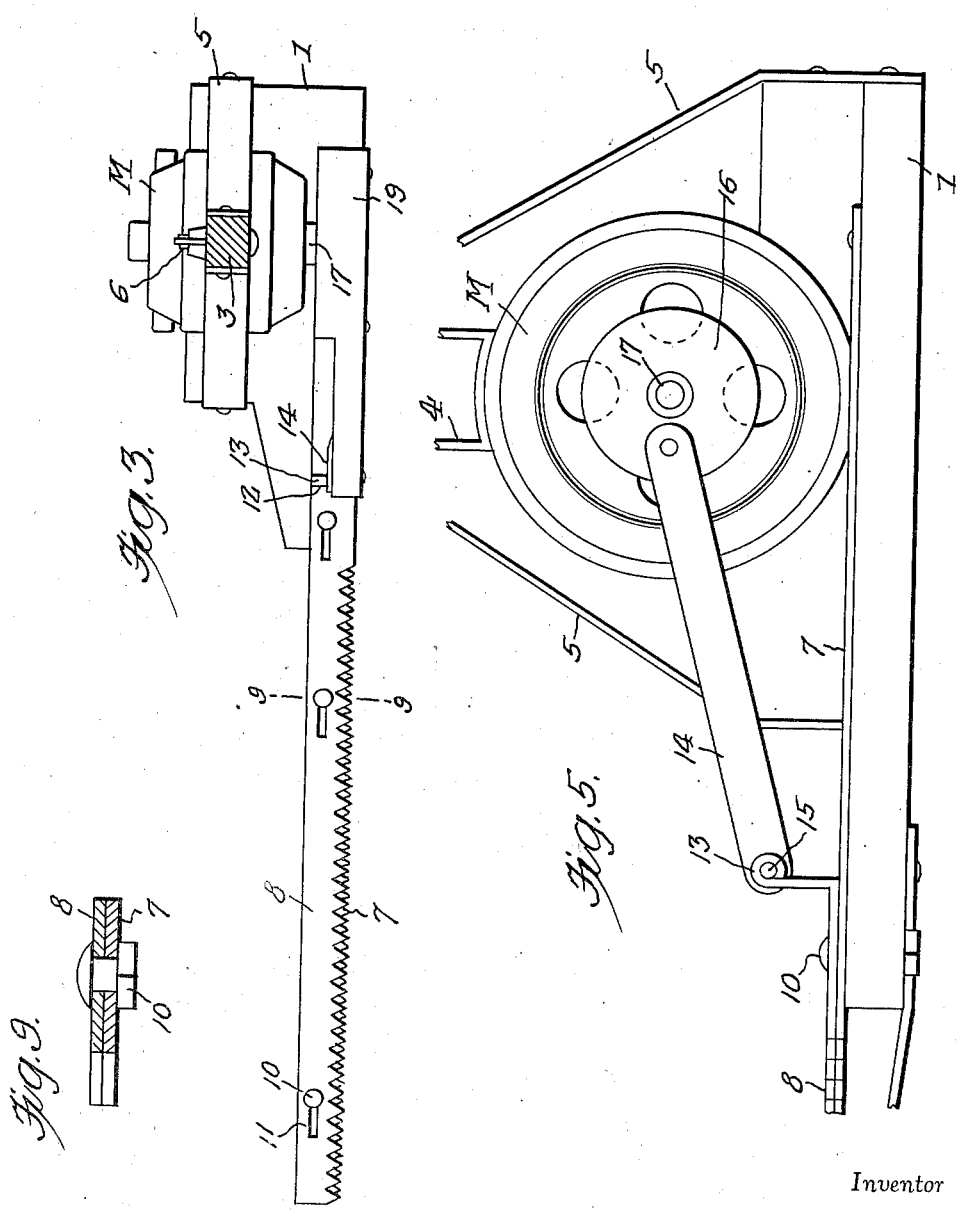

Patented May 11, 1937

2,080,315

UNITED STATES PATENT OFFICE 2,080,315

GRASS TRIMMER

John M. Hosier, Matamoras, Pa., assignor of one-half to Harold M. Young, Wilkes Barre, Pa.

Application March 15, 1935, Serial No. 11,339
Renewed January 18, 1937

2 Claims. (Cl. 56—25)

This invention relates to a grass trimmer, the general object of the device being to provide a motor driven device of simple form and of light weight so that one can trim grass along walks, under hedges, around flower gardens and near buildings and other places unable to be reached by lawn mowers, without the user bending over or exerting any unusual effort.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a front view of the device.

Figure 2 is a rear view thereof.

Figure 3 is a top plan view with the handle in section.

Figure 4 is an edge view looking toward the motor end of the device.

Figure 5 is an enlarged fragmentary front view.

Figure 6 is a perspective view of the front shield.

Figure 7 is a view of the switch of the motor.

Figure 8 is a section on the line 8—8 of Figure 1, with the switch removed.

Figure 9 is a section on the line 9—9 of Figure 3.

Figure 10 is a section on the line 10—10 of Figure 4.

Figure 11 is a view of the front end of the knife bar.

In these drawings the numeral 1 indicates a platform to which a small electric motor M is connected and the lower section 2 of a handle, the upper section of which is shown at 3, is connected with the motor by the bracket 4 and braces 5 connect the section 2 with the platform, the front part of the platform being much longer than the rear part and the motor and the braces 5 are connected to the rear part of the platform as shown in Figure 3. The upper end of the lower section 2 and the lower end of the section 3 overlap as shown more particularly in Figure 4 and a bolt and thumb nut 6 connect these overlapping parts together so that the upper section 3 can be adjusted on the lower section. A stationary knife bar 7 has one end connected with the top face of the front part of the platform and the toothed portion of this knife bar extends a considerable distance beyond the platform. A brace bar 7' is connected with an intermediate part of the under face of the bar 7 and with a part of the under face of the platform, as shown in Figures 2 and 5. A movable knife bar 8 is supported for reciprocatory movement on the stationary bar 7 by the studs 10 passing through holes in the stationary bar and through longitudinally extending slots 11 in the movable bar. The inner end of the movable bar is bent upwardly as shown at 12 with an eye 13 formed at its upper end and a pitman 14 has a pivot 15 at one end passing through the eye. The other end of the pitman is pivoted to a disk 16 attached to the motor shaft 17 so that the movable knife bar is driven directly from the motor, through the pitman.

A shield 18 has its lower edge fastened to the front of the platform 1 and covers the pitman and the disk and has its upper end bent rearwardly as shown at 19, the flange formed by this bent part being ridged as shown in Figures 1 and 6. The conductors 20 for supplying current to the motor are supported from the handle as shown at 21 and the switch 22 for controlling the flow of current to the conductors is carried by a perforated bracket 23 attached to the handle as shown more particularly in Figure 8.

Thus it will be seen that one grasping the handle can move the device so that the knives will cut grass close to buildings, hedges and the like and along walks and around flower beds and the like.

If desired the handle can be bent so that the device can be placed well under hedges or the like. The device can be used with the platform off the ground, or if the user desires, he can place the platform in contact with the ground and move it over the ground during the cutting operation. By having the bar 7 connected to the top face of the platform, the cutting mechanism will be spaced from the ground when the device is used with the platform resting on the ground.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A trimmer of the class described comprising a platform, an elongated stationary knife bar having one end connected to the top face of the front portion of the platform, a movable knife bar sliding on the stationary bar, a motor on the platform having an armature shaft, a disk connected with the motor shaft, a pitman having one end eccentrically pivoted to the disk, the inner end of the movable bar being bent upwardly and pivotally connected at its upper end to the other end of the pitman, and a handle connected with the platform.

2. A trimmer of the class described comprising a platform having a wide front part and a narrow rear part, a motor provided with a shaft and connected with the rear portion of the platform and having its shaft extending over the front portion thereof, a handle section having its lower end connected with the top of the motor, braces connecting said section with the rear part of the platform, a second handle section pivotally adjustably connected at its lower end with the upper end of the first section to permit angular adjustment with respect to the first section, a stationary knife bar having one end connected with the upper face of the front part of the platform, a movable knife bar slidably supported on the stationary bar and having its inner end bent upwardly, a disk on the motor shaft, a pitman eccentrically pivoted at one end to the disk and its other end pivoted to the bent part of the movable bar.

JOHN M. HOSIER.